Sept. 16, 1958     H. J. FAUSTICH, JR     2,851,817
SAFETY FISH HOOK WITH RETRACTABLE BARBS
Filed Sept. 17, 1956

INVENTOR.
HENRY J. FAUSTICH, JR.
BY
Carl Miller
ATTORNEY

2,851,817

SAFETY FISH HOOK WITH RETRACTABLE BARBS

Henry J. Faustich, Jr., Patchogue, N. Y.

Application September 17, 1956, Serial No. 610,058

2 Claims. (Cl. 43—44.82)

This invention relates to fish hooks and, more particularly, to fish hooks have retractable barbs.

The removal of the fish hook from a fish can some times be inconvenient and tedious and, in the case of large game fish, can also be dangerous. An object of this invention, therefore, is to provide a safety fish hook having retractable barbs that is simple in construction, efficient in operation, and which will overcome the aforementioned inconveniences and difficulties ordinarily encountered.

Another object of this invention, is to provide a safety hook having retractable barbs extending in a plurality of directions which is substantially fool-proof and which will prevent the fish from escaping.

All of the foregoing and still further objects and advantages of the present invention will become apparent from a study of the following specification, taken in connection with the accompanying drawing, wherein.

Figure 1:
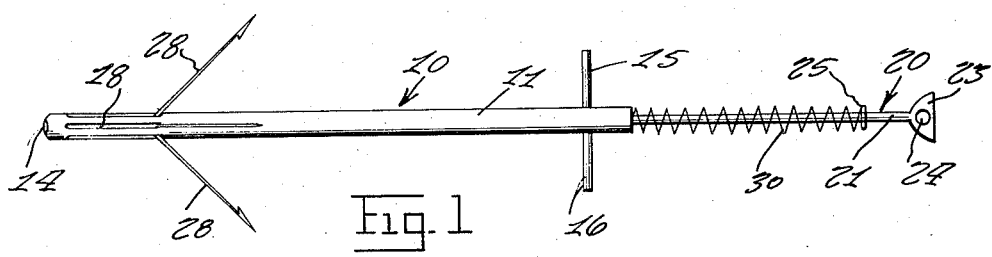
Figure 1 is a side elevational view of a safety hook made in accordance with the present invention, with the parts in an operative position.
Figure 3:
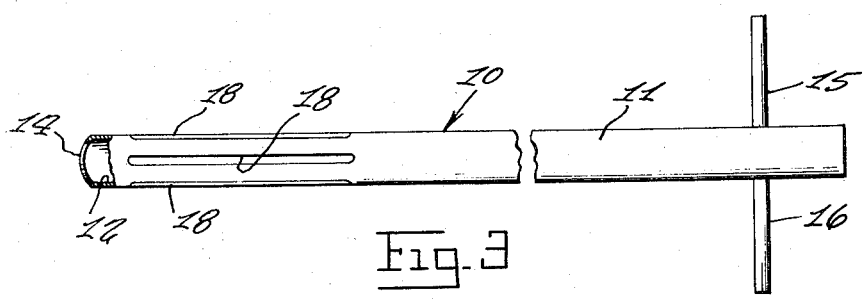
Figure 3 is an enlarged side elevational view, with parts broken away, showing one of the major components of the assembly shown in Figure 1.

Referring now to Figure 1 of the drawing, a safety hook made in accordance with the present invention is shown to include two major components; namely, a sleeve 10 and a retractable shaft 20. As is more clearly shown in Figure 3, the sleeve 10 includes an elongated hollow circular tube 11 having an internal bore 12 extending longitudinally therethrough. One end of the tube is provided with an opening 14, the other end of which has a pair of diametrically opposite and outwardly extending studs 15, 16. The tube 11, adjacent to the opening 14 is provided with a plurality of longitudinally extending and circumferentially spaced slots 18.

Figure 4:
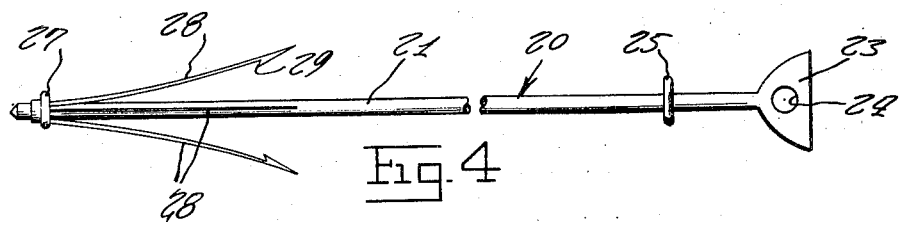
Figure 4 is a view similar to Figure 3, showing another major component.

Referring now to Figure 4 of the drawing, the retractable shaft 20 is shown to include a circular rod 21 having an integral thumb plate 23 with a centrally disposed aperture 24 disposed at one end thereof. A snap ring 25 is secured by any suitable means to the rod 21 adjacent to the thumb plate 23. A similar snap ring 27 is secured, in any suitable manner, such as by spot welding or crimping, to the opposite extremity of the rod 21 for rigidly maintaining a plurality of flexible tines 28 in circumferentially spaced arrangement around the rod 21. The outer free ends of the tines 28 are provided with barbs 29.

Figure 2:
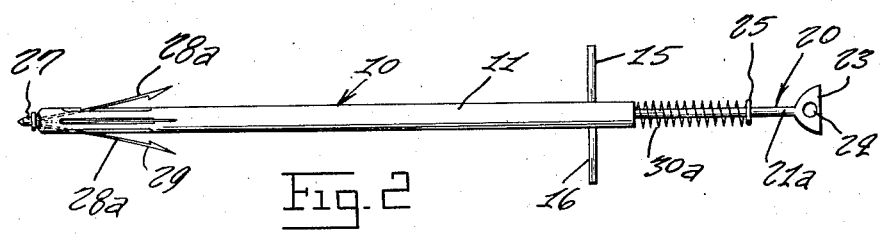
Figure 2 is a view similar to Figure 1 showing the associated parts in a retracted position.

Referring now to Figure 1 of the drawing, the shaft 20 is shown in assembled position with the sleeve 10, with a compression spring 30 seated at one end against the extremity of the sleeve adjacent to the studs 15, 16, and at the other end against the integral snap ring 25, secured by any suitable means to the rod 21. The spring 30 normally maintained the shaft 20 in the outwardly extended position shown in Figure 1. In this position, the tines 28, which are spaced circumferentially around the rod 21 symmetrically with the spacing of the slots 18 around the tube 11, extend through the slots and are directed upwardly and outwardly toward the upper end of the sleeve. In actual use, the fish line is secured to the apertured plate 23 and the bait is secured to the tines 28. When the fish takes the bait, the tines enter the mouth of the fish at the same time and penetrate in all directions therein. The hook can be withdrawn from the mouth of the fish only by retracting the tines. This is accomplished by grasping the studs 15, 16, between the fingers of the hand and depressing the thumb plate 23 against the action of the spring 30. This places the spring in a compressed state 30a wherein the inner end of the rod 21 is extended outwardly to the opening 14 in the bottom of the sleeve. The outer ends of the slot 18 engage with and depress the tines 28a during this movement of the rod 21 to its depressed position 21a, all as shown in Figure 2. In this position, the hook may be readily removed from the mouth of the fish, after which the thumb plate is released and the parts placed in the normal position shown in Figure 1, under the action of the spring 30. It will be recognized, that the barbs 29 on each tine may be eliminated, if desired, since the circumferentially spaced arrangement of the tines is effective to prevent the hook from being removed from the mouth of the fish without retracting the tines in the manner described.

While this invention has been described with particular reference to the specific forms shown in the drawing, it is to be understood that such is not to be construed as imparting limitations upon the invention, which is best defined by the claims appended hereto.

Having thus described my invention, I claim as new and desire to secure by Letters Patent:

1. A safety fish hook comprising, in combination, a hollow cylindrical sleeve, said sleeve having a plurality of longitudinally extending and circumferentially spaced apart slots therein adjacent to one end of said sleeve, said one end of said sleeve defining a constricted opening, a pair of outwardly extending diametrically opposed studs secured to the opposite end of said sleeve, a shaft slidably received within said sleeve for reciprocating longitudinal movement, one end of said shaft extending outwardly through the supported stud end of said sleeve, the opposite end of said shaft having a plurality of outwardly extending circumferentially spaced flexible tines integrally connected to the end of said shaft and each extending through one of said slots in said sleeve, and a spring carried outwardly of said sleeve acting between said opposite end of said sleeve and said one end of said shaft for urging said shaft in a direction outwardly of said opposite end of said sleeve to forcibly spread said tines radially outwardly toward a fully outwardly extended position, maxiumum retraction of said shaft within said sleeve being operative to only partially retract said tines within said sleeve, said retraction of said shaft effecting movement of said opposite end of said shaft outwardly through said constricted open end of said sleeve, and said open end permitting the flow of water through said sleeve, the inner surface of each said tine when in said extended position abutting one extremity of said respective slot to maintain said tine in said extended position.

2. A safety fish hook as set forth in claim 1, where the outer surface of each of said tines and the opposite extremity of said slots are of such a shape that when said tines are in said retracted position, said tines abut the opposite extremity of said slots to urge said tines towards said retracted position.

References Cited in the file of this patent

UNITED STATES PATENTS

| | | |
|---|---|---|
| 524,035 | White | Aug. 7, 1894 |
| 1,152,698 | Bonner | Sept. 7, 1915 |
| 1,609,151 | Bruenig | Nov. 30, 1926 |
| 1,609,160 | Deckman | Nov. 30, 1926 |
| 2,455,784 | Lapsensohn | Dec. 7, 1948 |
| 2,537,879 | Culhane | Jan. 9, 1951 |
| 2,789,856 | Russell | Apr. 23, 1957 |

FOREIGN PATENTS

| | | |
|---|---|---|
| 6,626 | Great Britain | Apr. 21, 1884 |